United States Patent [19]

Clyma

[11] Patent Number: 4,476,778
[45] Date of Patent: Oct. 16, 1984

[54] ONION PEELING

[75] Inventor: Malcolm R. Clyma, Holden Hill, Australia

[73] Assignee: Spring Gully Pickles Pty, Limited, Australia

[21] Appl. No.: 170,634

[22] Filed: Jul. 21, 1980

[51] Int. Cl.³ .............................................. A23N 15/08
[52] U.S. Cl. ........................................ 99/516; 99/536; 99/540; 99/546; 99/584; 99/589; 99/636; 209/693
[58] Field of Search .......................... 99/516, 534–536, 99/540, 546, 584, 586, 589, 591, 594–599, 635, 636, 642, 643; 198/377, 378, 692, 693, 342; 209/691–693, 700

[56] References Cited

U.S. PATENT DOCUMENTS

| | | | |
|---|---|---|---|
| 1,256,415 | 2/1918 | Woiach | 209/693 |
| 2,445,881 | 7/1948 | Hemmeter | 99/516 |
| 3,485,278 | 12/1969 | Parsons | 99/584 |
| 3,623,524 | 11/1971 | Buck | 99/516 |
| 3,886,951 | 6/1975 | McRobert | 209/693 X |
| 4,125,066 | 11/1978 | Stokes | 99/534 |

Primary Examiner—Philip R. Coe
Assistant Examiner—Timothy F. Simone
Attorney, Agent, or Firm—Harlan P. Huebner

[57] ABSTRACT

An onion peeling machine having a wheel for transporting the onions past a series of stations, where the onions are topped and peeled, the outer skins slit longitudinally of the onion, and the skin removed by water jets. The machine also includes separation means to separate the peeled onions from the skins.

3 Claims, 2 Drawing Figures

ONION PEELING

This invention relates to the peeling of onions, and more particularly to a machine enabling the onions to be peeled in a mechanical manner.

Onions, particularly onions which have been pickled by soaking in brine require to be peeled to enable the outside layers to be removed, so that there remains the clean white inside layers of the pickled onion, which are then bottled or otherwise processed for sale.

Up to the present time it has been customary for the peeling to take place by hand, but this is a highly labour orientated process which at the present time greatly increases the cost of processing the onions.

According to the present invention there is provided an onion peeling machine comprising means to position and move an onion through a topping and tailing position where the top and bottom of the onion are trimmed, and then move the onions through a slitting position where the outer skins of the onion are slit longitudinally of the onion, and then means to remove the slit skins from the onion.

Figure 1:
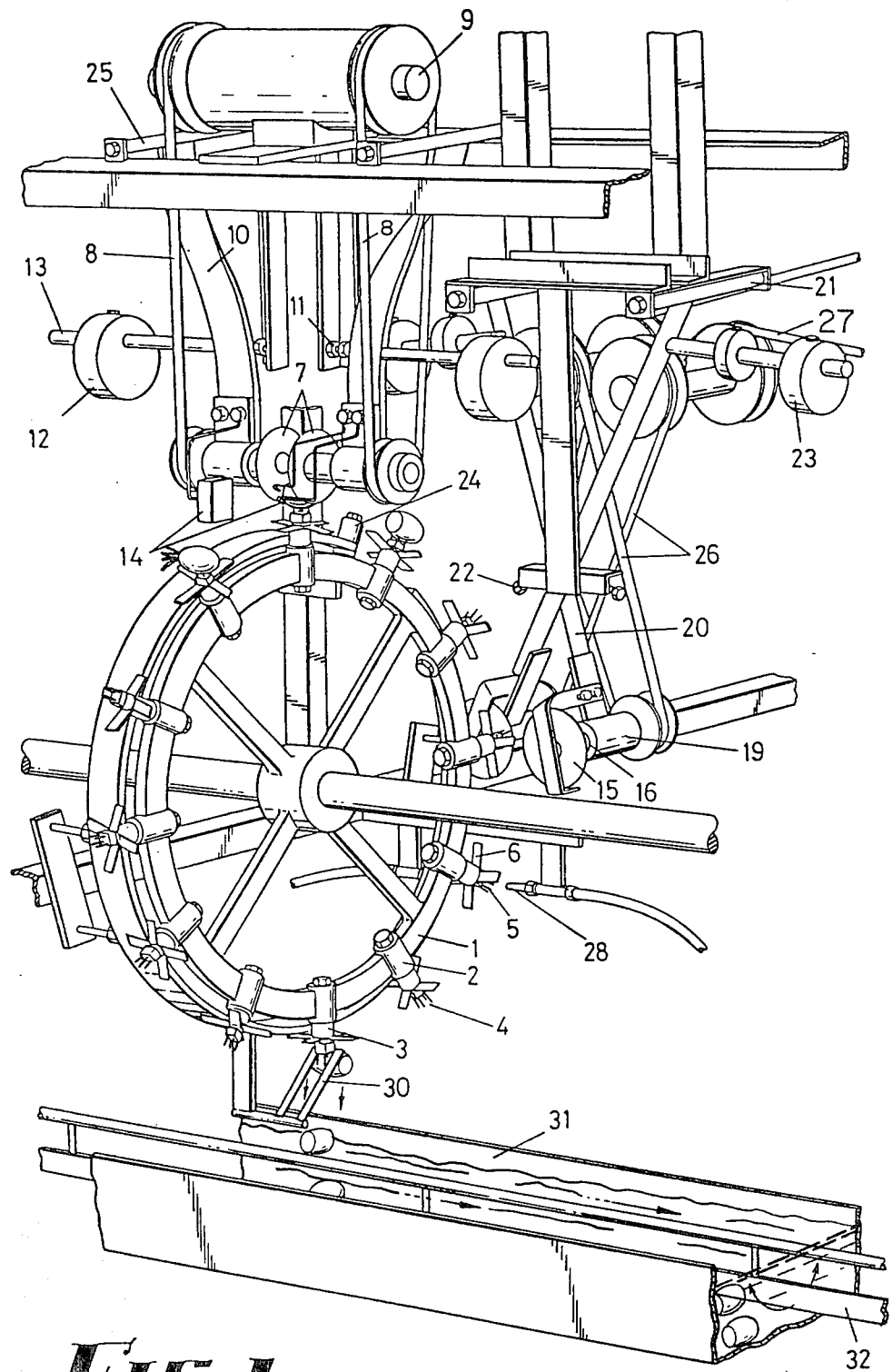
Figure 2:
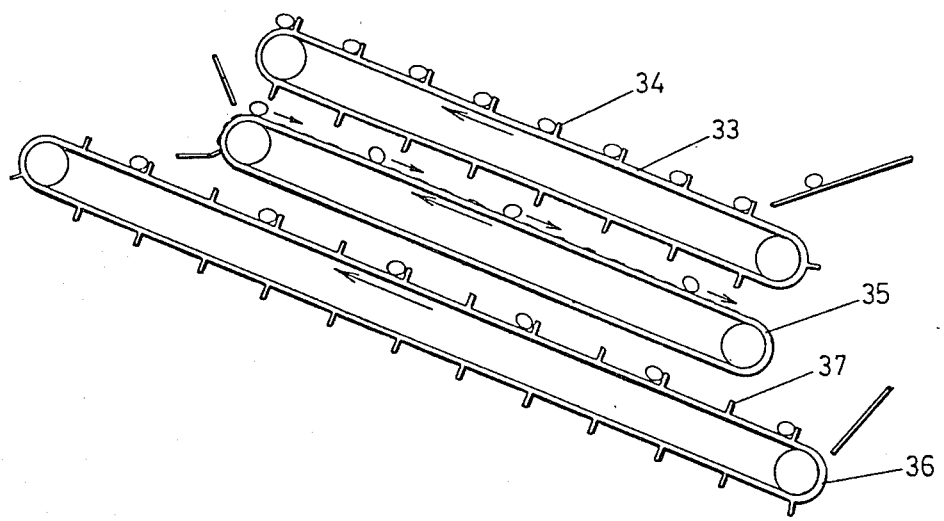

A preferred form of the invention will now be described with referrence to the accompanying drawings in which:

FIG. 1 is a perspective view of the invention, positions being omitted for the sake of clarity; and FIG. 2 is a view of the separating conveyors.

In a preferred form of the invention there is provided a wheel 1 carrying around its periphery a plurality of radial sockets 2 into which is mounted a stem 3 of an onion carrying device 4, this comprising a plurality, preferably 4 spikes 5 extending radially of this wheel 1, the wheel 1 being positioned so that a portion of the wheel will protrude through an opening in a surrounding casing, and as this portion protrudes through the opening the onions are placed on the pins with the onion being placed cross ways of the rim of the wheel, or in other words with the longitudinal axis of the onion being parallel to the axis of the wheel.

The stem 3 is adapted to be freely turned in the sockets 2, and the stem carries 4 fingers 6 which are adapted to engage in abutment 24 as the wheel turns so that the stem and thus the onion carried by the stem is turned through 90°.

The wheel 1 is mounted on a framework with the portion of the wheel protruding through an opening through the framework so that operators can then place the onion in position on the fingers. A plurality of wheels can be provided along the machine, although only one shown, so that the machine can thus handle large quantities of onions at the one time.

The onion is thus mounted on the spikes or pins 5, with the onion extending across the rim of the wheel. The wheel then passes through the topping and tailing knives 7 each of these being separately driven by V belts 8 from a driving shaft 9.

Each of the knives 7 is mounted and supported from the framework by spring arms 10 whose movement towards each other is limited by stops 11, weights 12 carried on arms 13 biasing the arms or levers 10 to bear against the stops 11, the arms 10 being pivoted by hinges 25 to the framework.

Each of the arms 10 at a lower end carry feelers and sensing means 14 which are adapted to contact the onion passing therethrough, and if the onion is of a greater length than the minimum length determined by the setting of the stops 11, then the onion contacts the feelers and sensing means 14 and moves the arms 10 the required distance so that the knives then top and tail the onion the desired distance from the end of the onion.

After passing through the topping and tailing section, one of the fingers 6 engages the abutment 24 to turn the onion through 90° so that the onion is now in a position to pass through and be presented to the slitting knives 15 which are orientated each with its axis generally radial to the axis of the wheel 1 carrying the onions, so that as the onion passes between the slitting knives, the onion being orientated with its longitudinal axis extending around the rim of the wheel, then the slitting knives 15 will slit each of the onions along opposite sides longitudinally of the onion, the slitting cutting through at least the outer layers of skin on the onion.

The shaft 16 of each of the slitting knives is mounted in a bearing 19 on the end of swinging arms 20 which are pivoted by pivot pins 21 to the framework. Each of the arms hangs downwardly and rests against adjustable stops 22, the arms also carrying balance weight 23 on balance arms extending from the arms 20, the balance weights being suitably positioned so that the arms 20 are so balanced that they tend to move to the stops 22 with a slight force. This is so adjusted that as the onions pass through the slitting knives, that the knives move apart and irrespective of the size of onion passing through, the force is only sufficient to cause the knives to slit through the outer layers of skin of the onion only.

The knives are driven by V-belts 26 from a further drive belt 27, and these knives 15 as well as the topping and tailing knives can be either sharpened knife blades or can be serrated or of sawtooth formation as desired.

The wheel 1 then carries the onions through past a station where the onions are hit with a jet or blast of water or other fluid from nozzles 28 which removes some or all of the outer layers of skin which have been slit, and then the wheel moves the onions to a stripping position to engage stripper 30 where the onions are removed from the pins. Preferably the jets of water are controlled by a valve actuated by an actuator (not shown) so that the water flows as a sudden blast when the onions are between the nozzles. The wheel then passes through to the loading station where further onions are placed longitudinally across the rim of the wheel and the process is repeated, it being realised then that the 4 fingers in turn on each passage of the in and through the machine turning the pins through 90°.

Although only one wheel is shown, it will be appreciated that a plurality of wheels, e.g. 2, 4, 6, or more can be provided in the one machine.

The invention also includes as one of its concepts the separation of the skins from the onion.

As noted above the onions were subjected to a jet of water, but this does not completely remove the skins from the onions. On release of the onions from the wheel, the onions fall into a trough of water 31, where the onions are finally separated from the surrounding skins, and are transferred to one end of the trough for final separation of the removed skins from the onion. The trough 31 extends for the length of the machine with the trough having a flow of water through. The flow of water is fairly slow, so that there is just a movement of water along the trough, and the water and onions and skins therein are agitated during the passage along the trough. The agitation is preferably provided by a paddle 32 or the like which extends the length of the trough, and is oscillated backwards and forwards across the trough so that there is agitation and relative movement between the onion skins and water so that all the loose skins are removed by this washing action as the onions and skins traverse along the length of the trough.

The flow of water is preferably provided by a small pump which can remove the water at one end of the trough and feed the water into the opposite end.

Thus in this concept of the invention there is provided the method of removing the skins from the onions, by a washing action producing gentle surges of water across and around the onions as they move along the trough.

At the end of the trough the skins and onions can be removed, and then the onions separated from the skins.

Preferably the separation is carried out by a conveyor 33 which elavates the skins and onions, this conveyor preferably having ribs or slats 34 thereon to lift the onions, and the onions and skins are then dropped on to a further conveyor towards the upper end thereof along the upper flight of the conveyor, this conveyor being smooth whereby the onions roll backwardly down the conveyor, but the skins will stick and adhere to the smooth conveyor 35. It is realised that the skins are wet, and the conveyor itself would be wet from the water which is present on the skins previously forwarded and moved over the conveyor, so that the skins will stick to this conveyor, but that the onions will roll back down to the bottom of the conveyor 35 where they are then diverted on to a further elevating conveyor 36 comprising slats 37 cups or the like so that the onions can then be transferred to a grading area and thus to a packaging area.

Thus the invention also includes within its concept the separate provision of the separating conveyors whereby the skins are adapted to adhere to the conveying surface, while the onions themselves roll back down that conveyor in order to thus separate the skins from the onions.

Although one form of the invention has been described in some detail it is to be realised that the invention is not to be limited thereto but can include various modifications falling within the spirit and scope thereof.

The claims defining the invention are as follows:

1. Apparatus for peeling onions, said apparatus comprising:

at least one wheel rotatably mounted on a shaft;

a plurality of radial sockets spaced circumferentially around said wheel, each socket fitted with a rotatable onion holder and each holder fitted with spike means to impale an onion on said holder; said holder adapted to move between at least two positions, a first position wherein an onion thereon has its longitudinal axis parallel with said shaft and a second position 90° thereto with said axis in the plane of said wheel;

a pair of spaced apart circular topping and tailing knives positioned one on each side of said wheel to simultaneously top and tail the onion as it passes therebetween when the onion holder is in said position;

finger means on said holders engageable with a fixed barrier to rotate said onion holder to said second position;

a pair of spaced apart circular rotary slitting knives positioned on each side of said wheel adapted to contact and slit the skin of said onion by slits extending along the longitudinal axis of said onion;

fluid means including at least one jet nozzle aligned with the path of travel of said onion and directed to the slit in the skin of said onion to loosen said slit skins from said onion;

stripper means through which said sockets pass for biasing said onion from said onion holding spikes means; and a skin removal means for agitating said onion and releasing said slit skins.

2. Apparatus as defined in claim 1 wherein said skin removal means is a trough of water and agitator means in said trough to agitate said onion and release said slit skin.

3. Apparatus as defined in claim 1 wherein said skin removal is a series of elevators one above the other which gravitationally allows an onion thereon to roll from one elevator to another whereby said slit skin will become loosened and released from said onion.

* * * * *